United States Patent [19]

Souza

[11] 4,245,422

[45] Jan. 20, 1981

[54] CONTAINER INCLUDING PULL-OUT STACKING TRAY STRUCTURE

[75] Inventor: Anthony J. Souza, Lancaster, Pa.

[73] Assignee: Woodstream Corporation, Lititz, Pa.

[21] Appl. No.: 42,417

[22] Filed: May 25, 1979

[51] Int. Cl.³ .............................................. A01K 97/06
[52] U.S. Cl. ............................ 43/57.5 R; 206/315 R; 312/DIG. 33
[58] Field of Search .......... 43/54.5 R, 57.5 R, 57.5 A; 206/315 R, 45.11, 45.17; 312/DIG. 33, 244, 227

[56] References Cited

U.S. PATENT DOCUMENTS

| | | | |
|---|---|---|---|
| 1,790,498 | 1/1931 | Dewey | 43/54.5 R |
| 1,858,539 | 5/1932 | Dewey | 43/57.5 R |
| 3,628,843 | 12/1971 | Wynne | 206/315 X |
| 3,985,409 | 10/1976 | Kneier | 312/DIG. 33 |

FOREIGN PATENT DOCUMENTS 2736994  6/1978  Fed. Rep. of Germany ... 312/DIG. 33

Primary Examiner—Nicholas P. Godici
Attorney, Agent, or Firm—Holman & Stern

[57] ABSTRACT

Disclosed is a container such as a fishing tackle box having a pull-out stacking tray structure, the individual trays of which are connected at their ends by pivotal linkages for attachment to opposite side walls of the container so that the trays can be stacked one above another at the top of the container or pulled out cantilever-wise by extension of the linkages. Attachment of the linkages to the container side walls is by way of intermediate members having elements which slot into fittings provided on the interior walls of the container. This arrangement facilitates final assembly of the container. The intermediate members can be formed to define compartments between the ends of the trays and the container side walls. A spinner-bait rack is also disclosed which fits into one of the compartments.

10 Claims, 5 Drawing Figures

U.S. Patent  Jan. 20, 1981  Sheet 1 of 2  4,245,422
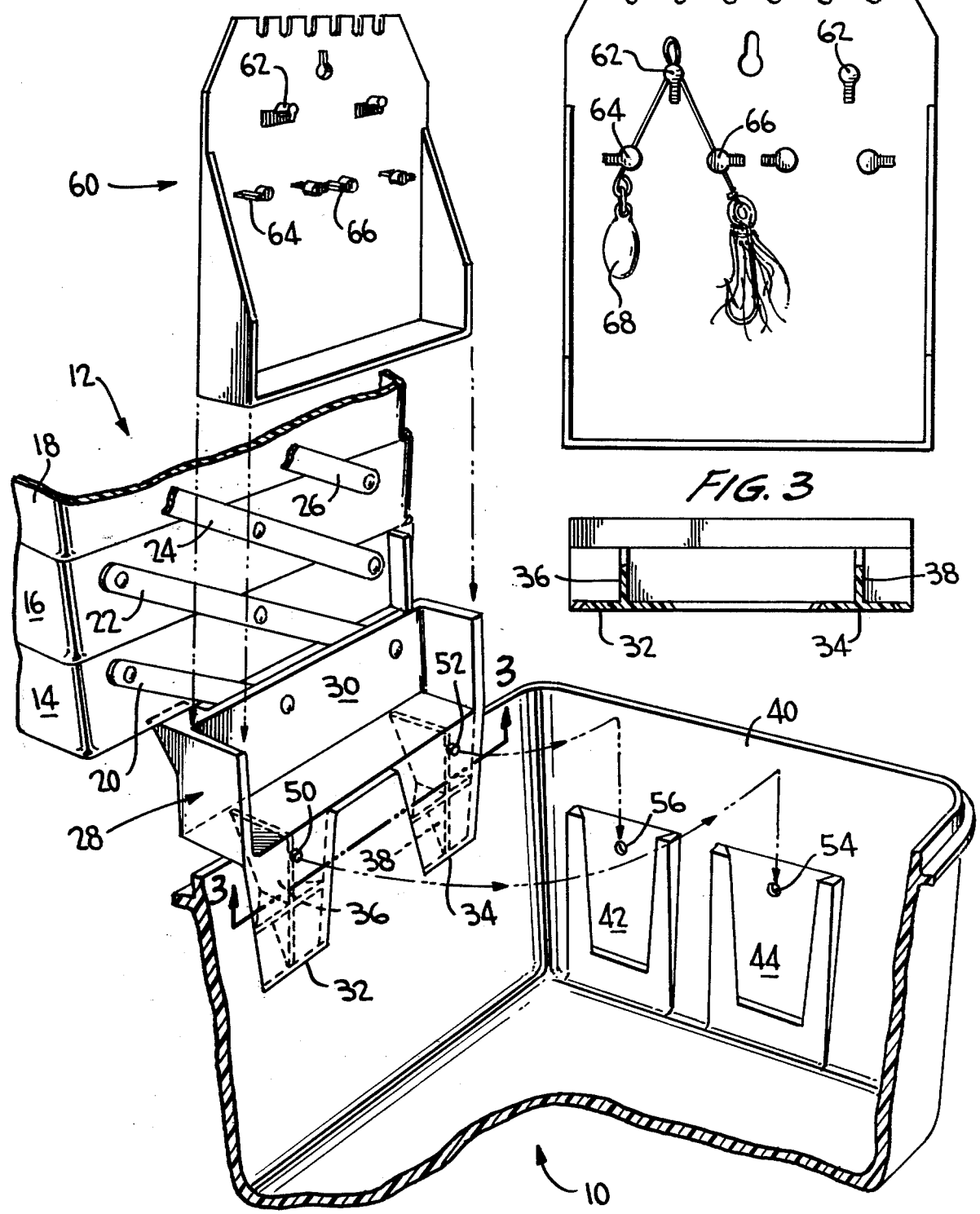

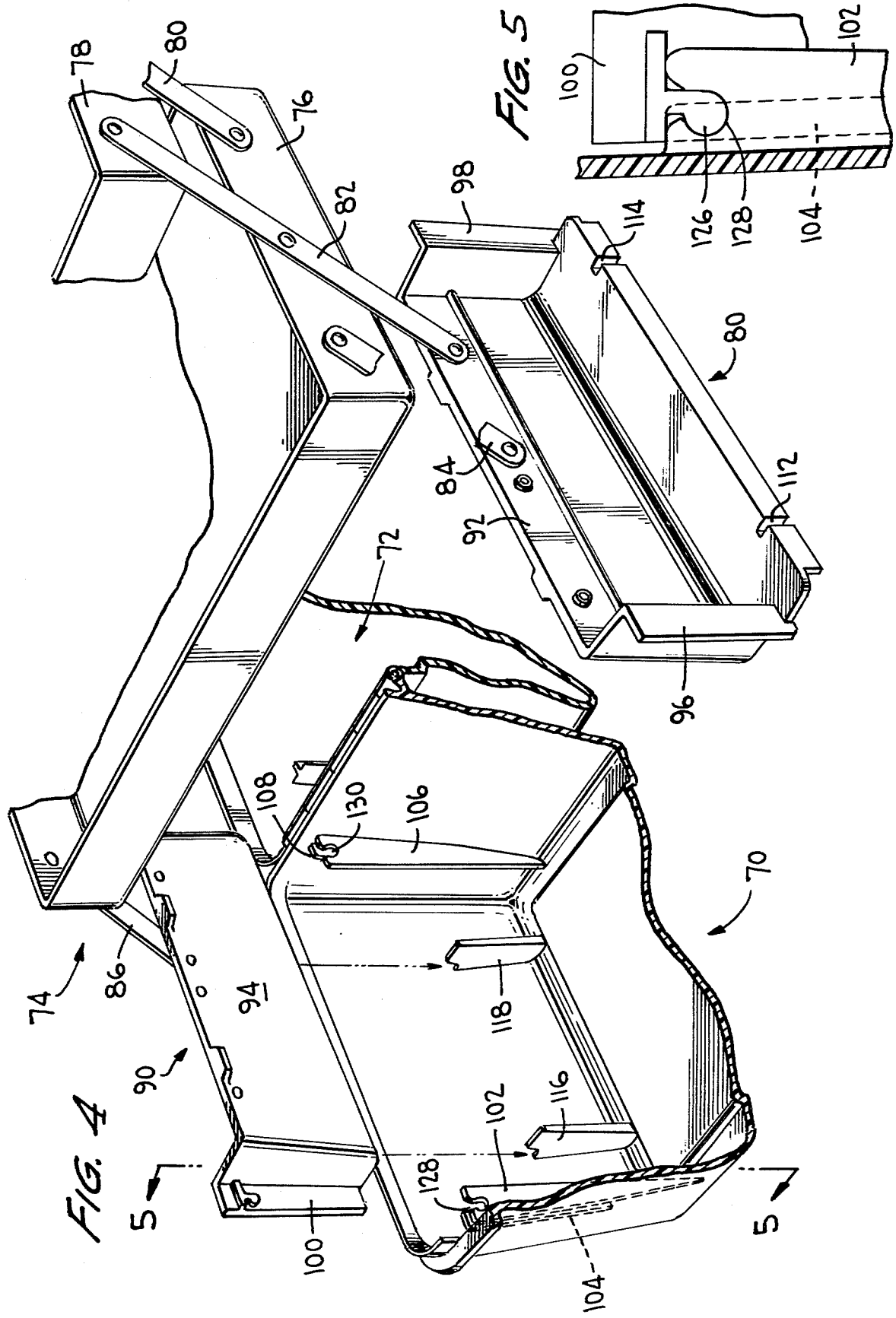

CONTAINER INCLUDING PULL-OUT STACKING TRAY STRUCTURE

BACKGROUND OF THE INVENTION

This invention relates to containers, such as fishing tackle boxes, which incorporate a pull-out stacking tray structure. Such boxes generally comprise a number of superposed trays interconnected at each side by a pivotal linkage which includes pairs of links pivotally attached to opposite internal side walls of the container. The arrangement is such that the trays can be stacked one above the other at the top of the container which includes a suitable lid for covering the stacked trays or, when the lid is open, the trays can be pulled out cantilever-wise on the pivotal linkage to obtain access to the interior of the container and to the individual trays. An example of a fishing tackle box incorporating this form of pull-out tray structure is shown in U.S. Pat. No. 3,410,018 to WOOLWORTH, issued Nov. 12, 1968.

In arrangements of the above type, the pivotal connections between the tray structure and the container are generally made by riveting the aforementioned links to the side walls of the container. The riveting operation is performed as one of the final stages in the assembly of the container, the tray structure and the container itself having been separately produced and the tray structure having been previously assembled. Riveting is a relatively complex and time consuming operation to perform as a final assembly step and it is an object of the present invention to provide an alternative form of attachment between the tray structure and the container which facilitates and simplifies the final assembly thereof.

A further object of the invention is to provide a container having a pull-out stacking tray structure which can, if required, be separated and entirely removed from the container.

Another object of the invention is to provide a container having a pull-out stacking tray structure wherein separate compartments are provided in the container on opposite sides of the stacked trays between the trays and the container side walls.

A still further object of the invention is to provide a container having a pull-out stacking tray structure which is simple and economical to manufacture and which is particularly suitable for use as a fishing tackle box.

SUMMARY OF THE INVENTION

In a container in accordance with the invention, the stacking tray structure is attached to the container via intermediate members to which the pivotal linkages of the tray structure are connected by riveting or like attachment means and which intermediate members include elements which slot from above into complementary retaining fittings provided on the interior walls of the container.

The intermediate members may be flat to allow the trays to extend substantially across the full width of the container or alternatively, the intermediate members may have a box-like portion to which the trays are attached. This latter alternative is designed for use with trays which do not extend substantially across the full width of the container and the box-like portions of the intermediate members define compartments between the sides of the trays and the side walls of the container. Where the container is a tackle box, these compartments may conveniently be used to accommodate such accessories as a spinner-bait rack and/or a lure box.

By arranging for the tray structure to be attached to intermediate members rather than being directly attached to the container side walls, final assembly of the container is considerably simplified insofar as the intermediate members need simply be slotted into their respective fittings in the container. Riveting of the pivotal linkage elements to the intermediate members is carried out during assembly of the tray structure itself where other riveting operations (of the linkages to the individual trays) are in any case needed. Where the tray structures are assembled in a different location to the final assembly of the tray structure to the container, the need for a riveting operation and additional riveting equipment at the final assembly location is therefore dispensed with.

BRIEF DESCRIPTION OF THE DRAWINGS

FIG. 1 is an exploded view of a part of a fishing tackle box,

FIG. 2 is a front view of a spinner bait rack for use with the tackle box of FIG. 1, FIG. 3 is a sectional view on line 3—'of FIG. 1, FIG. 4 is an exploded view of a part of a second form of fishing tackle box, and FIG. 5 is a view on line 5—5 of FIG. 4 showing the parts in an assembled condition.

DETAILED DESCRIPTION OF PREFERRED EMBODIMENT

The illustrated tackle box of FIGS. 1 to 3 has a container portion 10, a conventional form of hinged lid (not shown) and a pull-out stacking tray structure 12 comprising individual trays 14, 16 and 18, a pivotal linkage consisting of links 20, 22, 24 and 26 and an intermediate member 28 riveted to links 20 and 22. It will be appreciated that a like linkage and intermediate member are provided at the opposite end of the tray structure.

The intermediate member which is conveniently molded from hard plastic has a box-like portion 30 to which links 20 and 22 are riveted and a pair of keystone-shaped tongue-like elements 32 and 34 depending from the box-like portion. Each tongue-like element has bevelled edges as shown in FIG. 3 and reinforcing ribs 36, 38. A tray stop 46 is molded integrally with the intermediate member along its upper edge and a further stop 48 is formed on tray 14 as shown.

Side wall 40 of container 10, which may also be molded from hard plastic, is formed with internal pockets 42 and 44 complementary to the elements 32 and 34, the pockets, having bevelled surrounding walls as shown in FIG. 1 complementary to the bevels on elements 32 and 34. Like retaining pockets are formed in the opposite side wall of the container, not shown. Elements 32 and 34 slot into pockets 42 and 44 from above with a tight sliding fit to attach the tray structure to the container portion of the tackle box and the complementary bevelled formations retain the structure in place. Additionally, locating projections 50, 52 may be provided on elements 32 and 34 which engage depressions or openings 54 and 56 in the container side walls. These locating means can be arranged to be mutually disengaged to allow the tray structure to be removed from the container postion.

When the tray structure and container portion are assembled, the stacked trays sit atop the container portion and the lid, not shown, is shaped to fit over the stacked trays. When the lid is open, the trays can be pulled out cantilevel fashion by expansion of the pivotal linkage in known manner.

It will be appreciated that in the assembled condition of the tackle box, box-like portion 30 defines a compartment between the side of the trays and the container side wall. This compartment can conveniently be used to accommodate a lure box, not shown, or a specially designed spinner bait rack 60. The rack which fits snugly into the aforementioned compartment has one or more spinner bait retainers, two being illustrated, each retainer comprising three hook-like members 62, 64 and 66 arranged in a triangular formation with the single member 62 being upwardly directed while members 64 and 66 defining the lower apeces of the triangle are each inwardly directed. A spinner bait 68 is mounted on member 62 as shown in FIG. 2 by squeezing its outwardly sprung arms which, when released, are urged into contact with members 64 and 66 to positively retain the spinner bait in position. The illustrated spinner bait rack may also be in the form of a plastic molding.

The tackle box shown in FIGS. 4 and 5 is generally similar to that shown in the previous figures and includes a container portion 70, a hinged lid 72 and a pull-out stacking tray structure 74 comprising individual trays, only two of which 76 and 78 are shown, pivotal linkages including links 80, 82, 84 and 86, and intermediate members 88 and 90 riveted as in the prior embodiment to the linkages.

The intermediate members in this case comprise box-like portions 92, 94 to which the linkages are riveted as shown and transversely extending vertical flanges 96, 98, 100 which slot into vertical guides on the front and back interior walls respectively of container portion 70. Each vertical guide is defined by a pair of projecting webs as 102, 104 and 106, 108 molded integrally with the container portion and between which the respective flanges fit. Each flange has at its upper end a projecting tongue, as 126, which resiliently snaps into an opening, as 128, 130, in one of the webs, to retain the intermediate members in position and locating cut-outs, as 112, 114 in the base of each intermediate member fit in corresponding supports, as 116, 118 molded integrally with the side walls of container 70.

It will be appreciated that the box-like portions 92, 94 can again be specifically designed to fit a lure box or spinner bait rack as previously described and the materials and mode of assembly and use of the tackle box are generally similar to the previous embodiment. Further, the box-like portions are reversible for use at either end of the container portion.

While preferred embodiments only of the invention have been described in detail, it is to be understood that the invention is not limited to the particular features described herein and numerous modifications can be made within the scope of the invention as defined in the appended claims. For example, other forms of pivotal attachment means may be used in place of rivets to connect the pivotal linkages to the intermediate members. Further, while the intermediate members have been illustrated as having a box-like portion, these members could alternatively be flat for use in assemblies having trays which extend across the full width of the container portion, thereby eliminating the compartments at the sides of the trays.

The embodiments of the invention in which an exclusive property or privilege is claimed are defined as follows:

1. A box arrangement comprising:
   a container portion having an interior;
   at least one tray having opposite ends;
   pivotal linkage means at each end of said tray for permitting selective pivotal raising and lowering of said tray with respect to said container portion;
   attaching means at each end of said tray for attaching said linkage means to the interior of said container portion at opposite locations, respectively, of said container portion, said attaching means comprising:
   an intermediate member at each end of said tray;
   means pivotally securing said linkage means to a respective intermediate member; and
   connecting means for connecting each intermediate member to the interior of said container portion;
   wherein at least one intermediate member defines a compartment with a side of said container portion; and
   a storage rack removably disposed in said compartment.

2. The box arrangement according to claim 1 wherein said box arrangement is a fishing tackle box, and wherein said storage rack is a spinner bait rack including at least one spinner bait mounting means having an upwardly directed hook member and a pair of inwardly directed hook members disposed below and on opposite sides of said upwardly-directed hook member.

3. The box arrangement according to claim 1 further comprising:
   at least a second tray having opposite ends;
   further linkage means pivotally interconnecting said one tray and said second tray to permit selective movement of said second tray between a first position, in which said second tray nests in said one tray, and a second position, in which said second tray is disposed spaced from and above said one tray.

4. The box arrangement according to claim 1 wherein said connecting means comprises at least one substantially flat keystone-shaped member integral with said intermediate member and a receiving pocket defined integrally with said container portion for slidably receiving said keystone-shaped member from above.

5. The box arrangement according to claim 4 further comprising complementary locating means formed on said keystone-shaped member and said receiving pocket for positively positioning said keystone-shaped member in said receiving pocket.

6. A box arrangement comprising:
   a container portion having an interior;
   at least one tray having opposite ends;
   pivotal linkage means at each end of said tray for permitting selective pivotal raising and lowering of said tray with respect to said container portion;
   attaching means at each end of said tray for attaching said linkage means to the interior of said container portion at opposed locations, respectively, of said container portion, said attaching means comprising:
   an intermediate member at each end of said tray;
   means pivotally securing said linkage means to a respective intermediate member; and
   connecting means for connecting each intermediate member to the interior of said container portion at said opposed locations, said connecting means including a downwardly-projecting tongue-like member integral with said intermediate member and a web-like member integral with and projecting inwardly into said container portion, said web-like member having an upwardly-facing recessed portion for receiving the downwardmost portion of said tongue-like member, said recessed portion having an opening at its upper end which is smaller than the received tongue-like member to provide a resilient snap-fit with said tongue-like member.

7. The box arrangement according to claim 6 further comprising:
at least a second tray having opposite ends;
further linkage means pivotally interconnecting said one tray and said second tray to permit selective movement of said second tray between a first position, in which said second tray nests in said one tray, and a second position, in which said second tray is disposed spaced from and above said one tray.

8. The box arrangement according to claim 7 wherein at least one intermediate member defines a compartment with a part of said container portion, and further comprising:
a storage rack removably disposed in said compartment.

9. The box arrangement according to claim 8 wherein said box arrangement is a fishing tackle box, and wherein said storage rack is a spinner bait rack including at least one spinner bait mounting means having an upwardly directed hook member and a pair of inwardly directed hook members disposed below and on opposite sides of said upwardly-directed hook member.

10. The box arrangement according to claim 6 wherein said tongue-like member is disposed proximate the uppermost portion of said intermediate member, and wherein said recessed portion of said web-like member is disposed proximate the uppermost part of said container portion.

* * * * *